June 10, 1958 H. A. BING ET AL 2,837,854
PHOTOGRAPHIC TRANSPARENCY MOUNT
Filed Oct. 3, 1956 2 Sheets-Sheet 1

INVENTORS
Herbert A. Bing
John F. Lothrop
BY
Brown and Mikulka
ATTORNEYS

June 10, 1958 H. A. BING ET AL 2,837,854
PHOTOGRAPHIC TRANSPARENCY MOUNT
Filed Oct. 3, 1956 2 Sheets-Sheet 2

INVENTORS
Herbert A. Bing
and
BY John H. Lothrop

Brown and Mikulka
ATTORNEYS

# United States Patent Office 2,837,854
Patented June 10, 1958

2,837,854

PHOTOGRAPHIC TRANSPARENCY MOUNT

Herbert A. Bing, Wellesley, and John W. Lothrop, Westwood, Mass., assignors to Polaroid Corporation, Cambridge, Mass., a corporation of Delaware Application October 3, 1956, Serial No. 613,776

9 Claims. (Cl. 40—152)

This invention relates to a mount for a film material and more particularly to a mount for a photographic transparency adapted to be used with a projector.

An object of the invention is to provide an improved mount or holder for a transparency which permits the transparency to be easily and rapidly mounted or removed and which holds the transparency firmly in a desired plane.

Another object is to provide a mount having the foregoing advantages which, moreover, permits the transparency to be mounted in a correct manner only, namely, that in which the image area is properly centered on the central aperture of the mount and wherein the image-bearing or emulsion side of the transparency is adjacent that side of the mount which will be positioned adjacent the front or objective of the projector.

Other objects include the provision of a mount which is specially adapted to accommodate a transparency of a special asymmetric form; which possesses means for protecting the emulsion in which the transparency image is formed; and which is of lightweight, strong construction, attractive appearance and reasonable in cost.

These and other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
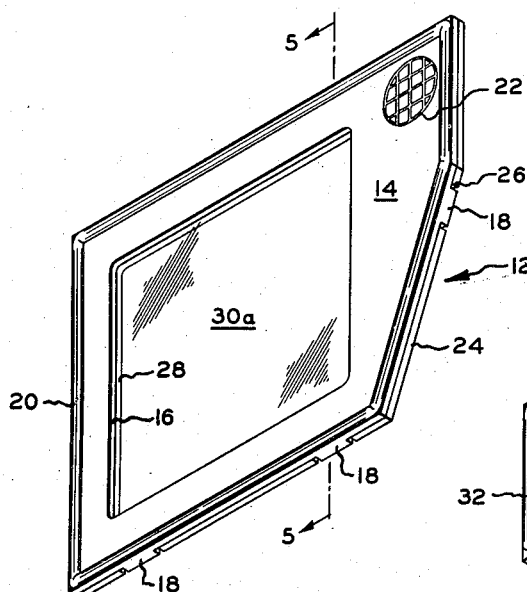
Figure 1 is a front view of the assembled film mount.

Referring to the drawings, Fig. 1 illustrates the assembled film mount 12 from the front, namely, it shows the face which would be positioned foremost in a projector. The film mount comprises a front frame member 14 having a central aperture 16, projecting fastener or lug means 18, a molding or bead 20 providing a bearing surface for positioning the mount in a slide carrier, an embossed area 22 which, when grasped, identifies the upper right-hand corner of the mount and enables its proper insertion in a projector in a darkened room, and a rear frame member 24 having recessed fastener means 26 and a central aperture 28. When the front and rear frame members 14 and 24 are pressed together and fastener means 18 are, accordingly, positioned within recessed fastener means 26, the fasteners serve to hold the front and rear frame members in assembled relation. A film transparency 30 is mounted between the frame members, the image area 30a being shown framed by aligned apertures 16 and 28. The joined frame members may easily be disassembled, to remove the transparency, for example, by inserting a blade therebetween and prying them apart.

Figure 2:
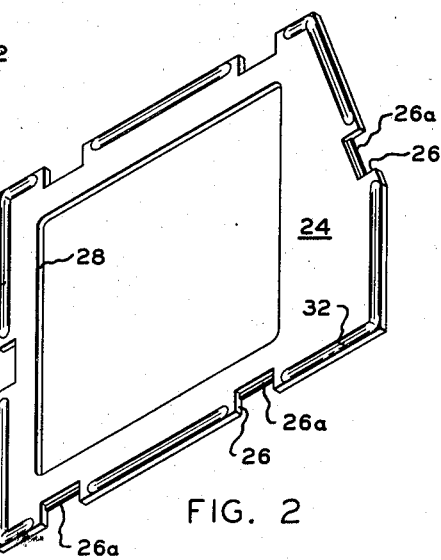
Fig. 2 is a view of the outer surface of the rear frame member of the mount.
Figure 3:
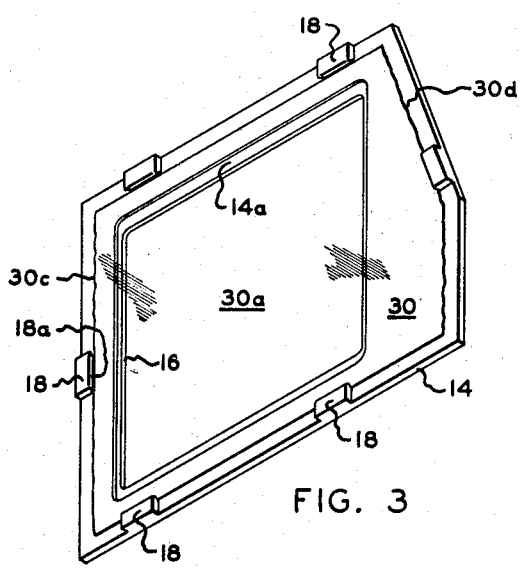
Fig. 3 is a view of the inner surface of the front frame member.

The individual separated front and rear frame members are shown in Figs. 2 and 3. Each member may appropriately be formed of a suitable plastic material, such as polystyrene, by an injection molding process. When thus formed, the members may possess a certain degree of flexibility which may be employed to cooperate in the interlocking or separation steps, but flexibility of the members is not essential to said interlocking or separation procedures. Through proper design of the molds, constructions permitting a perfect mating of interlocking fastener parts of the frame members are possible without requiring any handwork subsequent to the molding process. Fig. 2 is a rear view of the rear frame member 24 which has been separated from the front member. Particularly shown are the portions 26a of recessed fastener means 26, said portions being of reduced thickness with respect to the major areas of member 24 and having a slight taper so as to be adapted to positioning within undercut portions 18a of the fastener means 18 of the front frame member. The dimensions and tapered extremities of fastener portions 26a render them slightly compressible and thus facilitate their passage around the leading edge of the fastener means 18 of the front frame member. The taper also serves as a wedge which cooperates with the angular surface of the undercut portion 18a of fastener 18 to draw the frame members toward one another into tight engagement with the transparency. The cooperating tapers of the fasteners 18 and 26 permit transparencies of different thicknesses or, for example, a transparency and a protective surface element to be positioned between the frame members while insuring a positive interengagement of said fasteners. A molding 32 is shown which serves as a bearing surface for more efficiently positioning the transparency mount in a projector.

Fig. 3 illustrates a film transparency 30 positioned in the front frame member 14, the image area 30a of the transparency being aligned with aperture 16. It will be noted that film area 30 is of asymmetric form and has serrated edges 30c and 30d, said film area being, for example, of a type which has been removed from a larger area of material after the steps of image formation and processing. Proper lateral position of film 30 so that the image area 30a is properly centered with respect to aperture 16 is generally achieved by the upwardly projecting fastener or lug means 18, it being noted that said means 18 serve to locate film 30, at least approximately, in lateral directions. Assuming the film 30 to have the asymmetric contour shown, it will apparent that because of said contour and the locations of fastener means 18, the film can be positioned in front frame member 14 only in one correct way, namely, in the position shown, in which it is to be assumed that the image-bearing emulsion is next to frame member 14. It is not essential that all of the edges of film unit 30 should bear against fastener means 18 simultaneously, as illustrated, and, indeed, it may well be preferable that the film should be slightly smaller than the area bounded by said means 18 so that the film can be adjusted slightly in lateral directions to obtain the best registration of the image area 30a with aperture 16. A slightly depressed marginal area 14a is provided in frame member 14 so that damage to the emulsion side of the image area which is close to the edges of the aperture will not occur if it is necessary to perform slight lateral adjustments of the image area. The fastener means 18 have slightly rounded and undercut edges 18a which are thus formed for the purpose of sliding around portions 26a of fastener means 26 and slightly yielding to compressive contact therewith when the two halves 14 and 24 of the film mount are pressed together.

Figure 4:
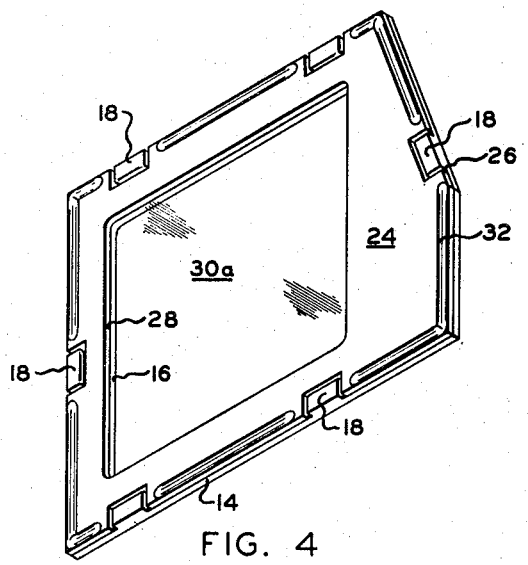
Fig. 4 is a rear view of the assembled mount.

The assembled transparency mount, including the transparency is illustrated from the rear in Fig. 4, the mutual engagement of the fastener means of each frame member being shown. It will be noted that the fastener means are positioned at diametrically opposite locations on each frame member.

Figure 5:
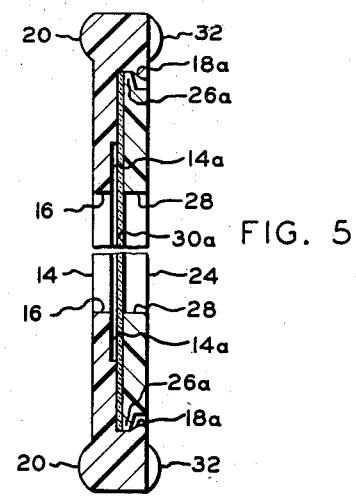
Fig. 5 is a sectional view of the assembled mount, taken on the line 5—5 of Fig. 1.

Fig. 5 illustrates, in section, the assembly of Fig. 1, taken on the line 5—5, and further shows the interlocking of fastener elements 18 and 26.

Figure 6:
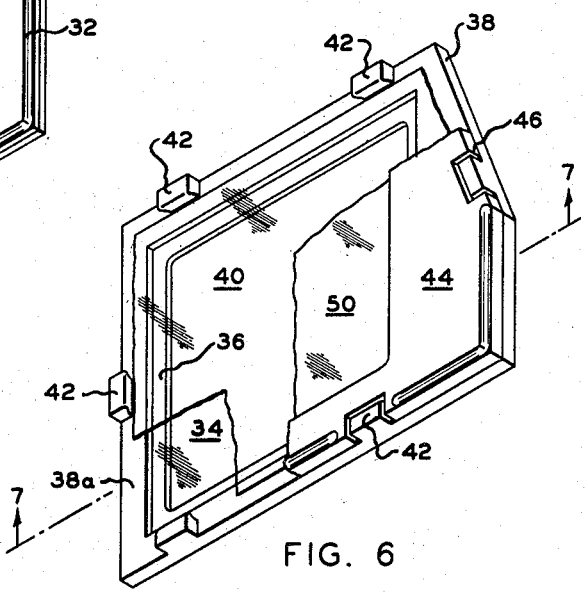
Fig. 6 is a rear view of a modified mount of the invention, with parts broken away.
Figure 7:
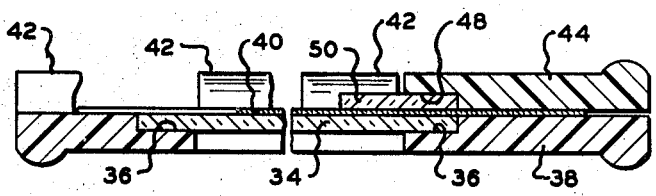
Fig. 7 is a partial sectional view, taken on the line 7—7 of Fig. 6.

A modification of the transparency mount is shown in Figs. 6 and 7 to illustrate the inclusion of protective surfaces for the exposed surfaces of the transparency which are framed in the aperture of the mount. A transparent plate 34 is fitted into a rectangular recess 36 formed in the rear surface 38a of front frame member 38, preferably so as to lie flush with said surface 38a. Plate 34 may be formed of a clear plastic material or, preferably, of a transparent glass and may, appropriately, be bonded to the frame member to impart further rigidity thereto. A transparency 40 is shown overlying recessed transparent plate 34 and a portion of rear surface 38a of the frame member, its lateral position being generally determined by upwardly projecting fastener means 42 which also serve in a positioning capacity. Rear frame member 44, having fastener means 46 cooperating with fasteners 42, and a recess 48, into which is fitted a transparent plate 50, similar to transparent plate 34, overlies the transparency. Accordingly, the transparency is both protected from scratching or other damage at both surfaces and is held flat throughout its area. The frame members are also provided with increased rigidity, as may be desired, if the plates are firmly attached to the frame members by bonding or other fastening means.

Assuming the transparency mounts hereinbefore described to be dimensionally suitable for carrying transparencies having measurements such as 2" x 2", 2¼" x 2¼" or 3¼" x 4", the mounts may be made larger to hold other transparency sizes. Where the mount is designed to hold a large transparency, for example, one measuring 8" x 10", it may be desirable to augment the holding surfaces of the fastener means to obtain a more positive locking of the two halves of the mount. This can be accomplished by increasing the depth of the undercut portion of fastener means 18 and that of the reduced thickness portion 26a of fastener means 26. If, as hereinbefore described, the mount is injection molded of a plastic material, it would probably be necessary during the molding process to employ a die which forms openings in frame 14 under the recessed portions of fasteners 18 to obtain the augmented depth of said portions, above described.

The invention is not limited to the asymmetric shape of the frame members shown. For example, the film mount may comprise rectangularly-shaped frame members having interlocking and other features described herein and either having a modified means for insuring that the film is always mounted in the film mount in a given manner or being devoid of this feature. Thus, a small matching corner area could be excised both from the film and from one of a pair of rectangular frame members while the other frame member has a built-up corner area which fills the void in the first-named frame member, or any other combination of an excised area of the film with a keying or positioning projection of a frame member may be employed.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A mount for an asymmetric film transparency comprising a pair of substantially flat interlocking frame members of asymmetric contour between the inner facing surfaces of which said transparency is mounted, said transparency being of a type having a contour similar to that of said frame members but having slightly smaller dimensions, each frame member having a central aperture which is substantially coextensive and aligned with that of the other and a continuous planar marginal area surrounding said aperture providing a bearing surface for said transparency, a first of said frame members having a plurality of integral fastener means projecting toward the second frame member from its inner surface and positioned at a plurality of given spaced locations adjacent its periphery, said fastener means each having an undercut transversely innermost face nearest said central aperture which is adapted to engage complementary fastener means of said second frame member, said transversely innermost face of each fastener means also serving, in cooperation with the asymmetric shape of said transparency and first frame member, as a positioning means for properly locating said transparency laterally and for insuring that the image-bearing emulsion thereof is properly centered and facing said first frame member, said second frame member also having a continuous planar marginal area surrounding its central aperture which provides a bearing surface for said transparency opposite to the first-named bearing surface, the fastener means of said second frame member comprising a plurality of recesses formed in the peripheral edges of said frame member and extending transversely inwardly toward said central aperture, the transversely innermost faces of said fastener recesses nearest said central aperture including portions of reduced thickness which are adapted to be inserted underneath and to be releasably locked by the undercut faces of the fastener means of said first frame member, locking together of the two frame members being achieved by pressing said members toward one another so that the innermost faces of the recessed fastener means are forcibly inserted under the undercut faces of the projecting fastener means whereby there is provided a continuous compression of the marginal areas of the transparency which surround the image areas.

2. A mount for a film transparency as defined in claim 1 wherein the periphery for each frame member comprises five angularly disposed linear edge portions, four, only, of said edge portions having said fastener means contiguous therewith.

3. A mount for a film transparency as defined in claim 1 wherein said frame members are substantially rigid and wherein the contacting surfaces of at least one of said projecting fastener means and fastener recesses are compressible.

4. A mount for a film transparency as defined in claim 1 wherein said frame member embodying said projecting fastener means includes a recessed border surrounding said central aperture, said border substantially preventing frictional contact of the image-bearing emulsion with the bearing surface of the frame member.

5. A mount for a film transparency as defined in claim 1 wherein said frame members are composed of a flexible plastic, and wherein a raised bead is formed adjacent the periphery of, and extends completely around, an exposed planar marginal area of at least one of said frame members, said bead providing a bearing surface with respect to slide mounting means of a projector.

6. A mount for a film transparency as defined in claim 1 wherein said projecting fastener means are compressible and have rounded initially-engageable surfaces which merge into substantially linear undercut contacting surfaces, and wherein said fastener recesses include initially compressible and subsequently engageable portions of a thickness less than that of the frame member containing them, whereby the initially compressible surfaces and portions are adapted to slide substantially around one another when said frame members are pressed together and said engageable portions of the recesses are adapted to pass beneath said undercut surfaces.

7. A photographic product comprising a positive print having an asymmetric marginal frame area, and a mount holding said print in correct position for viewing purposes, said mount comprising a pair of generally flat interlocking frame members of similar asymmetric contour between the inner facing surfaces of which said print is positioned, said print being of similar contour to that of said frame members but of slightly smaller dimensions, each of said frame members having a central aperture which is generally aligned with that of the other and a continuous planar marginal area surrounding said aperture providing a surface supporting said transparency, a first of said frame members having a plurality of integral fastener means projecting toward the second frame member from its inner surface and placed at laterally opposed locations adjacent its periphery, said fastener means each having an undercut, tapered, transversely innermost face nearest said central aperture which is adapted to engage complementary fastener means of said second frame member and to hold said transparency under continuous compression, said transversely innermost face of each fastener means also serving, in cooperation with the asymmetric shape of said transparency and first frame member, as a lateral positioning means for centering the image area of said transparency and insuring that the image-bearing emulsion thereof is facing said frame member, the second of said frame members also having a continuous planar marginal area surrounding its central aperture which provides a supporting surface for said transparency opposite to the supporting surface of said first frame member, the fastener means of said second frame member comprising a plurality of recesses formed in the peripheral edges of said frame member and extending transversely inwardly toward said central aperture, the transversely innermost faces of said fastener recesses nearest said central aperture including portions of reduced thickness which are inserted underneath and releasably locked by the undercut tapered faces of the projecting fastener means of said first frame member to provide said continuous compression of the transparency in areas surrounding the image area.

8. A photographic product as defined in claim 7 wherein are included a pair of transparent plates inserted in recesses formed in the inner surfaces of the frame members, the thickness of said plates taken with the depth of said recesses being such that the inner surfaces of said plates are coplanar with the inner planar marginal areas of said frame members.

9. A photographic product as defined in claim 8 wherein a principal surface area of the transparency exceeds that of the surface of each transparent plate by an amount substantially equivalent to the area of an inner planar marginal area of a frame member, compression of the transparency thereby being provided throughout both the image area and marginal area surrounding said image area.

References Cited in the file of this patent

UNITED STATES PATENTS

| 1,633,376 | Freeman | June 21, 1927 |
| 2,156,351 | Paul | May 2, 1939 |
| 2,505,250 | Kime et al. | Apr. 25, 1950 |
| 2,614,354 | Winslow | Oct. 21, 1952 |
| 2,663,105 | Woodbury | Dec. 22, 1953 |

FOREIGN PATENTS

| 707,500 | Germany | June 24, 1941 |
| 746,608 | Germany | Aug. 16, 1944 |